Patented Sept. 1, 1953

2,650,939

UNITED STATES PATENT OFFICE 2,650,939

HEXACHLOROCYCLOPENTENONE PREPARATION

Earl T. McBee and Jack S. Newcomer, West Lafayette, Ind., assignors to Purdue Research Foundation, West Lafayette, Ind., a corporation of Indiana No Drawing. Application October 1, 1948, Serial No. 52,405

3 Claims. (Cl. 260—586)

The present invention relates to a method of treating octachlorocyclopentene, and is more particularly concerned with a method of forming hexachlorocyclopentenone directly from octachlorocyclopentene by treatment thereof with sulfuric acid. This application is a continuation-in-part of our application Serial 757,949, filed June 28, 1947, which issued as Patent 2,493,009.

Prior methods for the preparation of hexachlorocyclopentenone (2,3,4,4,5,6-hexachloro-2-cyclopentene-1-one) involve the use of a seven-step procedure. The last four steps involved are 1) chlorination of 3,5-dihydroxybenzoic acid to a pentachlorodioxobenzoic acid, 2) further chlorination under different conditions to a hexachlorocyclohexenedione, 3) treatment with weak base to form a hydroxycyclopentenoic acid, and 4) oxidation with nitric acid. It may readily be seen that the cost of hexachlorocyclopentenone prepared by such a method is exorbitant.

It is an object of this invention, therefore, to provide a practical single-step process for the preparation of hexachlorocyclopentenone. It is a further object of the present invention to produce hexachlorocyclopentenone directly from octachlorocyclopentene in a single step. Another object of the invention is the provision of a novel process for the treatment of octachlorocyclopentene with sulfuric acid. Other objects will become apparent hereinafter.

The compound prepared by the method of the present invention is an important intermediate in the preparation of more complex organic molecules, such as perchloroindone, which may be subsequently converted to tetrachlorophthalic anhydride, a valuable constituent in the preparation of resins of the glyceryl phthalate type.

The process of the present invention includes the reaction of sulfuric acid with octachlorocyclopentene. The result of our new process was not to be expected, since a chlorocarbon ketone is not obtained by the reaction of hexachlorocyclopentadiene and sulfuric acid. The reaction can be performed in any suitable manner, such as by adding the sulfuric acid to the octachlorocyclopentene, with the reverse procedure also being satisfactory. Any suitable temperature may be used, and attainment of a satisfactory temperature range is evidenced by evolution of hydrogen chloride. Temperatures between about 60 degrees and about 150 degrees centigrade are suitable, with the optimum temperature being between about 95 degrees and 110 degrees centigrade, although other somewhat higher or lower temperatures may be used if desired. The time allowed for the reaction is dependent upon a number of factors, such as concentration of the reactants employed, amount of reactants present, temperature, method of agitation, et cetera. However, a period of about seven hours or less is usually satisfactory, or when the sulfuric acid layer of the reaction mixture has turned to a dark brownish-black. Agitation is preferably employed to ensure efficient contact of the reactants which will reduce the time required for the reaction. The reactants are employed in at least equimolar quantities, and sulfuric acid is ordinarily employed in molar excess, how much excess being dependent upon the quantity of reactants used, temperature, et cetera. The use of concentrated sulfuric acid is a preferred embodiment of the present invention, that is, sulfuric acid of a concentration of over 50 percent and preferably above about 70 percent. The hexachlorocyclopentenone may be separated from the reaction mixture, e. g., by decanting or quenching on ice, and purified in any conventional manner, such as by recrystallization, which will be apparent to one skilled in the art.

The following examples are given to illustrate the practice of the present invention but are not to be construed as limiting.

*Example 1*

A mixture of octachlorocyclopentene (150 grams, 0.44 mole) and concentrated sulfuric acid (900 grams, 8.5 moles) was placed in a three-neck flask equipped with a motor-driven stirrer, thermometer, and reflux condenser. The evolution of hydrogen chloride became appreciable at about 100 degrees centigrade. The temperature was maintained at 100–110 degrees centigrade, during which time the reaction mixture darkened. After seven hours, it appeared as if little or no reduction of the upper organic layer had resulted. The reaction product was cooled and poured onto ice. The resulting liquid product was recrystallized three times from petroleum ether to give 87 grams of a liquid (M. P. 22–24 degrees centigrade, 73.0 percent chlorine). Hexachloro-2-cyclopentene-1-one melts at 28 degrees centigrade and contains 73.6 percent chlorine.

*Example 2*

A mixture of octachlorocyclopentene (1932 grams, 5.34 moles) and concentrated sulfuric acid (2600 grams, 25.5 moles) was placed in a three-neck flask equipped with a thermometer, stirrer, and air condenser. The mixture was heated for seven hours at 105 degrees centigrade.

After cooling the reaction mixture to room temperature, the upper, light-yellow layer was separated from the lower, black sulfuric acid layer. After washing with water, the yellow oil weighed 1260 grams. The oil was crystallized from an equal volume of n-pentane to give a high yield of hexachloro-2-cyclopentene-1-one.

Various modifications may be made in the present invention without departing from the spirit or scope thereof, and it is to be understood that we limit ourselves only as defined in the appended claims.

We claim:

1. A process for the production of hexachlorocyclopentenone which comprises heating together octachlorocyclopentene and more than an equimolecular proportion of aqueous sulfuric acid having a concentration in excess of approximately 50 percent by weight of $H_2SO_4$, and subsequently recovering the hexachlorocyclopentenone from the reaction mixture.

2. A process for the production of hexachlorocyclopentenone which comprises heating together octachlorocyclopentene and more than an equimolecular proportion of aqueous sulfuric acid having a concentration in excess of approximately 70 percent by weight of $H_2SO_4$, at a temperature between approximately 60 and approximately 150 degrees centigrade, and subsequently recovering the hexachlorocyclopentenone from the reaction mixture.

3. A process for the production of hexachlorocyclopentenone which comprises heating octachlorocyclopentene with a substantial molecular excess of aqueous concentrated sulfuric acid at a temperature between approximately 95 and approximately 110 degrees centigrade, and subsequently recovering the hexachlorocyclopentenone from the reaction mixture.

EARL T. McBEE.
JACK S. NEWCOMER.

References Cited in the file of this patent

UNITED STATES PATENTS

| Number | Name | Date |
|---|---|---|
| 1,849,844 | Lloyd et al. | May 15, 1932 |
| 2,481,157 | Schmerling | Sept. 6, 1949 |

FOREIGN PATENTS

| Number | Country | Date |
|---|---|---|
| 570,668 | Great Britain | July 17, 1945 |

OTHER REFERENCES

McCombie et al., J. Chem. Soc., vol. 103, pp. 1995–2006 (1913).

Prins, Rec. trav. chim. des Pays Bas, vol. 51, pp. 1065–80 (1932).

Prill, J. A. C. S., 69, 63 (1947).

Prins, Rec. des Trav. Chim. Des Pays Bas 65, 445 to 467.